S. D. HARTOG.
PISTON.
APPLICATION FILED APR. 27, 1920.
1,398,690. Patented Nov. 29, 1921.
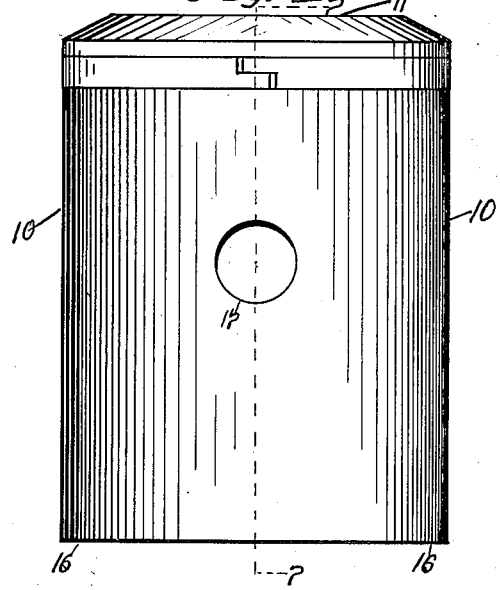
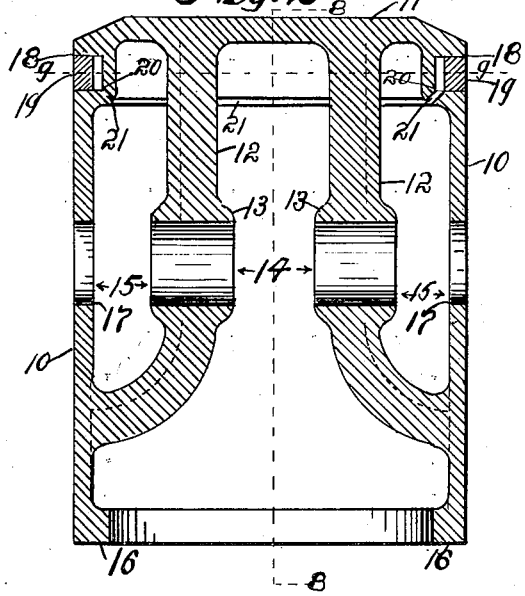
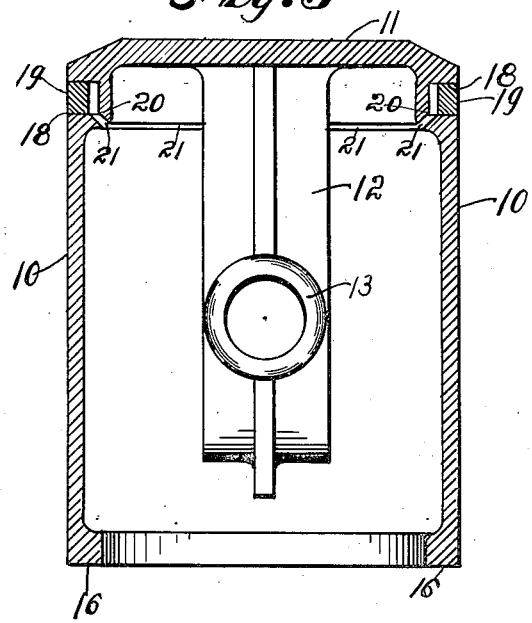
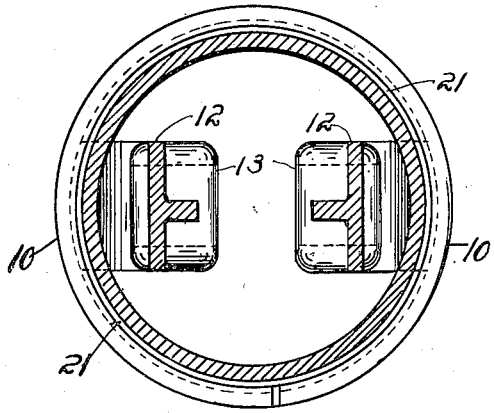
Inventor
Stephen D. Hartog

UNITED STATES PATENT OFFICE.

STEPHEN D. HARTOG, OF ST. LOUIS, MISSOURI.

PISTON.

1,398,690.   Specification of Letters Patent.   Patented Nov. 29, 1921.

Application filed April 27, 1920. Serial No. 377,108.

*To all whom it may concern:*

Be it known that I, STEPHEN D. HARTOG, a citizen of the United States, and a resident of the city of St. Louis and State of Missouri, have invented new and useful Improvements in Pistons, of which the following is a specification.

This invention relates to pistons, more particularly to pistons for use in internal combustion engines.

The piston is the movable member within the cylinder of the engine and in the internal combustion engine the head portion of the piston is subjected to direct contact with the high heat temperature due to the frequent explosions of the ignited gases in the combustion chamber. The ordinary pistons in common use have two or more split metal packing rings positioned in grooves formed in the head section of the piston the purpose and function of which is to make of the piston and the cylinder a gas and compression tight vessel free from leakage.

The piston and its packing rings unlike the cylinder is not provided with means for cooling or controlling its temperature and the head portion thereof and the packing rings positioned in the grooves formed therein quite frequently attain a temperature of 750 to 1000 degrees Fahrenheit.

Piston packing rings are ordinarily made of cast iron and their structure is that of a thin circular band having a cut out portion the purpose of which is to provide a spring tensional resiliency for the rings.

The delicate structure of the packing rings is such that they are unable to withstand the high heat temperature to which they are subjected and consequently failing in their function to efficiently and properly pack the cylinder and the piston gas and compression tight.

The present invention therefore, is the improvement in pistons the purpose and construction of which is to overcome the difficulties above referred to.

To such ends the invention comprises a piston having a head and body, oppositely disposed internal ribs, comparatively narrow in width, and extending longitudinally of the vertical axis of the piston having integral intersection with the head and body at respectively predetermined positions, a piston ring groove formed in the head portion of said piston, a slit formed within the piston ring groove and extending entirely through the head portion of the piston, parting the head portion of the piston from its body portion thereby providing an opening through which the lubricating oil is flushed in and out of said opening and said piston ring groove and against the back surface of the piston packing ring positioned in said groove, providing means for cooling and controlling the temperature of the ring.

The object, therefore, of the present invention is to construct a piston with means for cooling and controlling the temperature of the ring within its groove by supplying a constant flow of lubricating oil against the back of the ring for the purpose of maintaining its spring tensional resiliency enabling it to more properly and efficiently perform its function as a packing ring by maintaining its tension by controlling its temperature.

Another object is to provide means enabling the ring groove to be drained of the oil flushed therein thereby preventing the formation of carbon back of the ring which would otherwise occur causing the ring to be pressed outwardly against the cylinder wall which tends to cut into or score the cylinder.

Another object is that of combining in a single structure the desirable features of a piston having limited body expansion effected by parting the head from the body thereby preventing the direct transmission of heat from the head to said body, maximum packing ring efficiency and increased body bearing surface exceeding that of prior art constructions.

For the purpose of enabling others to understand, make, and use this invention the following description is given supplemented by the accompanying drawing, in which:

Figure 1, is a vertical elevation.

Fig. 2, is a vertical elevation in section along the line 7—7 Fig. 1.

Fig. 3, is a vertical elevation in section along the line 8—8 Fig. 2.

Fig. 4, is a plan view along the line 9—9 Fig. 2.

In the drawing like numerals of reference indicate corresponding parts throughout the several figures. The numeral 10, designates the body of the piston which is circular in form and in most cases approximately of the same length as its diameter. The internal portion of the body 10, is cored leaving a thin wall between the outer and inner surface of the body 10. The top of the body 10, is provided with a head portion 11, which is integrally connected to the body 10, by longitudinally extending ribs 12, having their intersection with the head and body at a predetermined position, more preferably, however, with the under surface of the head 11, midway each side of the center line of the internally cored opening and the inner surface of the body 10, leaving a space between the bosses 13, which supports the piston pin and between which at 14, the connecting rod is positioned on the piston pin neither of which are here shown. The lower end of the ribs 12, have their intersection with the body 10, midway the end 16, and the holes 17, of the body 10, permitting a space 15, between the body 10, and the bosses 13. The ribs 12, are made especially narrow in width and long in length for the reason that this particular structure of piston will not permit of a circular internal webb which would cause the internally cored area to be very much reduced or otherwise obstructed, a condition to be avoided in this construction, which necessarily requires as large an internal area as is practically possible for the purpose of permitting the flushing of as large a volume of oil therein for reasons hereinafter explained.

At the top of the piston in the head portion 11, a piston ring groove 18, is cut in the side face thereof of requisite width and of a depth in excess of the thickness of the ring 19, leaving a space between the back of the ring 19, and the bottom of the groove 18, somewhat greater in extent than that of the ordinary practice. At the bottom of the ring groove 18, at 20, a slit or cut 21, is made passing entirely through the head portion 11, and downwardly at an angle approximately of 45 degrees parting the head portion 11, from the body 10. The slit or cut 21, is practically equal in width to that of the space allowed back of the ring 19, and the bottom of the ring groove 18, providing an unobstructed channel or cavity constructed to permit the lubricating oil in the crank case of the engine to be splashed or flushed by the motion of the revolving crank shaft up and into the internally cored portion of the piston a quantity of which constantly passing into and out of the slit or cut 21, and against the back surface of the piston packing ring 19, thereby cooling the ring to such an extent as to maintain uniform temperature of the ring whereby its spring tensional resiliency as initially provided is retained against the cylinder wall causing the ring to more efficiently function as a packing ring than as has heretofore been possible.

My invention therefore, overcomes all of the difficulties as has hereinbefore been explained, with the additional feature that my invention also provides a construction of piston that will operate effectively and satisfactorily having but a single packing ring due to the fact that its spring tension is always maintained effectively against the cylinder wall by means of the oil cooling system with the additional advantage which facilitates the groove 18, to be drained when the engine is stopped thereby preventing the formation of carbon back of the ring 19.

The common practice is to mold the piston into form by using aluminum, composition alloy, metal or cast iron. The piston is then machined on its outer surface 10, somewhat smaller in diameter than the bore of the cylinder, the usual practice being to allow an amount of .0005″ for each diameter of the bore of the cylinder for the size of the piston body 10, to be machined less than the cylinder bore to allow the piston to expand but not to bind in the cylinder, thus the common practice would require that a piston 4″ in diameter be machined to a diameter of 3.998″. Grooves are then cut in the head section of the piston in most cases 3 ring grooves are cut the width of which depending on the diameter, ordinarily a piston 4″ in diameter has 3 ring groove in its head portion ¼″ wide and each groove is separated or spaced from each other about $\frac{3}{16}''$ by a spacing ridge between each groove, the head section is then machined smaller in diameter slightly below the last ring nearest the piston pin hole than the body 10, ordinarily .003 for each inch diameter of the bore of the cylinder, because the head section is subjected to greater expansion than the body, a piston 4″ in diameter is ordinarily machined to 3.988″ in diameter. The common practice therefore is such that the available bearing surface of the body 10, of the piston is $1\frac{5}{16}''$ short of what it really ought to be.

The foregoing description of that which at present is the common practice is given for the purpose of distinguishing my present invention from that ordinarily practised as my improved construction of piston permits the entire surface below the single ring at the top of the body 10, to be utilized as the available bearing surface of the piston.

The body 10, of my improved construction can be machined to a size as will slidably fit the bore of the cylinder over its full length as the heat is not transmitted to the body 10, directly, being interrupted by the space 21, which parts the head portion within the groove 18, from the body 10, preventing the body 10, from the excessive expansion, thus my improved construction results in the accomplishment of 3 vitally important features of advantages by one single act, namely, employing a single packing ring with cooling means for said ring, maximum bearing surface for the piston, minimum body expansion of the piston.

It is obvious from the foregoing description that this construction of piston fulfils the purpose for which it is intended and it is to be understood that minor changes may be made in the size, form and shape of this structure without departing from the spirit of this invention within the scope of the appended claims.

Having thus described the invention what I claim and desire to secure by Letters Patent is:

1. A piston having a parting between the head and body of said piston, a piston packing ring for said piston, said packing ring positioned within and supported by the surfaces of the parting between the head and body and snugly fitting therebetween, said packing ring having its interior surface entirely and unobstructedly exposed to the contact of oil as flushed thereagainst, providing a cooling medium for said ring for the purpose of retaining its tensional resiliency.

2. A piston provided with a packing ring groove, which permits the packing ring within said groove to have its entire interior surface unobstructedly exposed to the contact of oil, whereby said ring is cooled and its tensional resiliency thereby retained.

3. A piston having a packing ring groove cut circularly around and extending entirely through the head section of said piston, a piston packing ring adapted to snugly fit sidewise within the groove thus formed, so that the interior surface of said ring is entirely and unobstructedly exposed to the contact of lubricating oil as flushed against the exposed surface of said ring, thereby cooling the ring for the purpose of retaining its tensional resiliency.

4. A piston having a packing ring groove which separates the head from the body of said piston, a piston packing ring seated within said groove, said ring having its interior surface unobstructedly exposed to the contact of oil as flushed thereagainst through the opening formed by the groove which separates the head from the body of said piston, and means connecting said head and body together in operable unity.

5. A piston having a head and body, internal ribs integrally connecting said head and body, a piston ring groove formed in the head portion of said piston, said groove parting said head and body from each other, a piston packing ring adapted to snugly fit within and to be positioned in the groove thus formed, and having its interior surface unobstructedly exposed to the contact of lubricating oil as flushed thereagainst through the opening formed by the groove, which separates the head and body of said piston, and cooling means thus provided for said piston packing ring for the purpose of retaining its tensional resiliency.

6. A piston provided with a packing ring groove formed within the head section thereof and extending entirely therethrough and circularly therearound, parting the head entirely from the body, oil cooling means provided by the opening within the groove which parts the head from the body for a piston packing ring seated within said groove, means integrally connecting said head and body together and means on said connecting means adapted to form engaging connection with operable parts for said piston.

7. A piston having a head and body, oppositely disposed internal ribs integrally connecting said head and body comparatively narrow in width and extending longitudinally of the vertical axis of the piston, supporting means on said ribs adapted to form engaging connections with operable parts for said piston, a piston packing ring groove formed in the head of said piston separating the head portion from the body portion of said piston, a piston packing ring seated within said groove thus formed, oil cooling means provided for said packing ring by means of the parting within the groove which separates the head portion from the body portion of said piston.

In confirmation hereof I hereto attach my signature.

STEPHEN D. HARTOG.